United States Patent Office
2,852,583
Patented Sept. 16, 1958

2,852,583

RUBBER STABILIZED WITH CARBAZOLE CONDENSATION PRODUCT

Herman Westlinning, Stotzheim, near Koln, and Helmut Meis, Letmathe, Sauerland, Germany, assignors, by mesne assignments, to Rütgerswerke-Aktiengesellschaft, Frankfurt am Main, Germany No Drawing. Application August 6, 1954
Serial No. 448,380

Claims priority, application Germany August 8, 1953

2 Claims. (Cl. 260—800)

The present invention relates to novel rubber compositions and particularly to such compositions having retarded ageing properties.

The use of nitrogen containing compounds as antioxidants or age retarding substances in rubber compositions is already known. In so far as secondary amines are employed for this purpose, they have the disadavantage that light colored vulcanizates tend to discolor on exposure to light. Condensation products of styrenes with phenols have also been suggested as age retarding agents. These condensation products, while only causing slight discoloration of the vulcanizate, do not have as good a protective action as secondary amines such as, for example, phenyl-$\beta$-naphthylamine.

In accordance with the invention, it was found that condensation products of styrene and styrene derivatives with carbazole are unexpectedly good age retarding substances for natural and synthetic rubbers. They do not cause discoloration of rubber vulcanizates upon exposure to light and have a protective action approximating that of the secondary amines.

These known condensation products can easily be produced on a commercial scale by condensing one mol carbazole with 2 mols of styrene or its derivatives in the presence of inorganic surface active earths such as bleaching agents (see U. S. application Serial No. 432,947, filed May 27,1954), now abandoned. The derivatives of styrene which can be employed in place of styrene for the production of such condensates are functional derivatives in which the vinyl group, attached directly to the aromatic nucleus such as benzene and naphthalene nuclei, is unaltered. Preferred derivatives are $\alpha$ methyl styrene, vinyl naphthalene and the like. The condensation products are high boiling oils or crystalline substances. The use of such condensates as age retarders in rubber provide a good outlet for carbazole which occurs in rather substantial quantities in coal tar.

The quantity of carbazole styrene condensation products which can be employed in the rubber compositions according to the invention can, for example, be up to 2 parts by weight, preferably 0.5 to 1 part by weight, per 100 parts by weight of rubber.

The following examples will serve to illustrate several rubber compositions according to the invention.

Example 1

A rubber batch was prepared containing 100 parts by weight raw rubber
40 parts by weight active precipitated silica
1 part by weight stearic acid
3 parts by weight ozocerite
5 parts by weight zinc oxide
5 parts by weight titanium oxide
1.3 parts by weight cyclohexylmercaptobenzothiazylsulfenamide
3.8 parts by weight sulfur and
1 part by weight of the crystalline condensation product of two parts of $\alpha$ methyl styrene with one part of carbazole having a M. P. of 175° C.

The batch was then vulcanized for 40 minutes at 134° C.

The following table compares the properties of the vulcanized composition after 14 days ageing in a Geer oven at 70° C. in comparison with those of the composition before ageing:

|  | Before ageing | After ageing |
|---|---|---|
| Tensile strength, kg./cm.² | 252 | 145 |
| Elongation on break, percent | 581 | 351 |
| Modulus, 300 percent, kg./cm.² | 89 | 118 |
| Elasticity, percent | 56 | 57 |
| Shore hardness | 60 | 66 |
| Abrasion loss mm.³ | 190 | 293 |
| Impact strength, kg./cm.² | 24.5 | 5.8 |

Example 2

A rubber batch was prepared containing 100 parts by weight raw rubber
40 parts by weight active silica
2.5 parts by weight paraffin oil
1 part by weight stearic acid
5 parts by weight zinc oxide
10 parts by weight titanium oxide
2.5 parts by weight mercaptobenzothiazyldisulfide
0.5 part by weight hexamethylenetetramine
3.0 parts by weight sulfur and
0.7 part by weight of a crystalline condensation product of carbazole and styrene. The batch was then vulcanized for 15 minutes at 143° C.

The following table compares the properties of the vulcanized composition after 14 days ageing in a Geer over at 70° C. in comparison with those of the composition before ageing:

|  | Before ageing | After ageing |
|---|---|---|
| Tensile strength, kg./cm.² | 249 | 183 |
| Elongation on break, percent | 567 | 415 |
| Modulus, 300 percent, kg./cm.² | 93 | 122 |
| Elasticity, percent | 63 | 59 |
| Shore hardness | 59 | 63 |
| Abrasion loss, mm.³ | 169 | 193 |
| Impact strength, kg./cm.² | 18 | 6 |

We claim:

1. A rubber composition containing the crystalline condensation product of 1 mol of carbazole with 2 mols of a styrene compound selected from the group consisting of styrene, alpha methyl styrene and vinyl naphthalene in a quantity up to 2 parts by weight per 100 parts by weight of rubber in said composition, the quantity of such condensation product being sufficient to be effective to increase the resistance to ageing of such composition.

2. A composition according to claim 1 in which the quantity of said condensation product in said composition is 0.5 to 1 parts by weight per 100 parts by weight of rubber in said composition.

References Cited in the file of this patent

FOREIGN PATENTS 666,718   France _____ May 28, 1929